United States Patent Office 3,366,576
Patented Jan. 30, 1968

3,366,576
HIGH DENSITY CERAMIC BERYLLIA-NUCLEAR FUEL COMPACT CONTAINING AN ADDITIVE FOR THE RETENTION OF FISSION PRODUCTS
Robert A. Meyer, San Diego, and Fred H. Lofftus, Del Mar, Calif., assignors to the United States of America as represented by the United States Atomic Energy Commission
No Drawing. Filed Oct. 20, 1966, Ser. No. 588,679
3 Claims. (Cl. 252—301.1)

ABSTRACT OF THE DISCLOSURE

A ceramic compact with improved fission product retention consisting essentially of beryllia, certain selected oxide or carbide additives and fissile or fertile fuel.

---

The present invention relates generally to ceramic materials suitable for use in nuclear reactors. More particularly, it relates to ceramic nuclear fuel materials wherein an oxide of a fissile or fertile material is dispersed in a beryllia matrix that has high retentivity for fission products produced during operation of a nuclear reactor.

It has previously been proposed to use, as a nuclear fuel material, mixtures of an oxide of a fissile or fertile element with a refractory oxide of an element of low neutron absorption cross-section, such as beryllia. However, sintered compacts made of such mixtures have not had as good properties of fission product retention at temperatures above about 1000° C. as desired.

To provide ceramic nuclear fuel compacts having improved retentivity for fission products, it has been previously proposed to provide a vitreous material comprising a combination of oxides which causes a liquid phase during sintering and envelopes the particles of fissile or fertile oxide present in the ceramic. Such vitreous material, however, is undesirable when reactor operating temperatures above about 1000° C. are utilized since the vitreous material would be subject to localized melting.

Accordingly, it is an object of the present invention to provide ceramic materials having improved physical properties at elevated temperatures. A further object of the invention is to provide ceramic nuclear fuel materials having high fission product retentivity for both metallic and gaseous fission products. It is a still further object of the present invention to provide ceramic nuclear fuel materials and a method for making such materials that have uniform high density and minimum number of open pores.

These and other objects of the present invention are more particularly set forth in the following detailed description.

Generally, the invention provides a ceramic nuclear fuel compact made of particles of an oxide of a fissile or fertile element dispersed in a matrix of beryllia which contains certain additives that greatly enhance the fission product retentivity. It has been found that the addition of small quantities of silicon dioxide, silicon carbide, thorium oxide, carbon or particular mixtures of these materials to the beryllia matrix prevents the formation of open pores that penetrate to any substantial depth in the compact during the subsequent sintering operation.

In a nuclear fuel material of this general type, fission product retentivity is generally considered good for most reactor purposes when a release to birth ratio (hereinafter sometimes referred to as R/B ratio) of fission products of $10^{-4}$ or lower exists. It is believed that fission product retention is enhanced by small grain size, uniform high density and absence of open pores between grain boundaries. When grain growth is not inhibited, smaller grains combine to form larger grains during sintering, and voids appear to form within the newly formed larger grains. In addition to these voids, it is believed that relatively large pores may often form between the final large grains. Final grain size after sintering is also related to the initial particle size of the beryllia powder used to form the compact.

It is also desirable to achieve a high density as measured by percentage of theoretical density since such high density is an indication of the extent to which void spaces or pores have been eliminated or closed. The need for achieving a high percentage of theoretical density is, however, not considered as important as achieving a uniform density throughout the matrix. The apparent reason for this is that the statistical probability of substantial pore penetration into the matrix decreases when the matrix is uniformly dense, i.e., when such pores as exist are distributed uniformly in the matrix. This prevents deep penetration of the matrix by random coupling of individual pores.

It is believed that the existence of open pores which extend for a substantial distance into the compact and lead to the outside surface of the compact is the primary contributor to a high amount of fission product release. Consequently, to achieve a high level of fission product retention, it is important to close or eliminate pores which would penetrate to substantial depths in the compact. It has been found that the addition to the beryllia mixture before sintering of certain additives (herein referred to as pore-closing additives) in amounts up to about 6.0 percent by weight of the beryllia eliminates the formation of such pores during the sintering process. Additives which have been found effective include silicon dioxide, silicon carbide, thorium oxide, carbon and mixtures of carbon and silicon carbide, of carbon and silicon dioxide, and of carbon and thorium oxide.

In this connection, it has been found that levels of as little as 0.3 percent silicon dioxide, 1.0 percent carbon, 1.0 percent silicon carbide and 1.0 percent thorium oxide, with lesser individual amounts for the various carbon mixtures, are effective in the practice of this invention (all percentages are by weight of the total material contained in the sintered compact). While, as stated above, no increased advantage from addition of the pore-closing additives of this invention is considered to be obtained above a level of about 6.0 percent, higher levels may be used without detriment. It is presently thought that these pore-closing additives at sintering temperatures may cause the formation of some phase which suppresses grain growth at the active sites for combination of smaller grains. While suppression of grain growth during sintering and a resultant compact with small grain size is desirable, it is also thought that any residual pores which might exist within the beryllia matrix after the sintering operation has been completed are closed by gaseous condensation products.

The additives of this invention may be used to improve the characteristics of both fueled and unfueled beryllia. Such unfueled beryllia might be used to provide very good fission product barrier material for nuclear reactor applications. The fueled beryllia compacts would in themselves be fission product retentive when used in a nuclear reactor.

Beryllia, whether fueled or unfueled, may be formed to provide compacts by suitable ceramic forming technique, such as hot pressing, cold pressing or extrusion followed by sintering. The various additives may be introduced directly in a finely divided form or in any other suitable form which yields the desired additive. If carbon is used as an additive it may be introduced in the form of a heat-decomposable carbon-providing material. Preferably, an organic material, such as ethylcellulose, is used. It may be desirable to use ethylcellulose rather than carbon itself since the ethylcellulose may also serve the additional function of a binding material for the green (as-pressed) compacts. Silicon dioxide, if used as an additive, may be introduced in the form of silicic acid ($H_2SiO_3$). Subsequent treatment in inert or reducing atmospheres at the contemplated temperatures of about 1700 to 1900° C. provides the desired form of the additive, e.g., carbon or silicon dioxide.

As stated above, final grain size after sintering is also related to the initial particle size of the beryllia powder. Beryllia powder of less than about 1.0 micron particle size should be used for forming the compacts of this invention. Preferably, beryllia having a particle size between about 0.5 and 0.8 micron is used.

When preparing fueled beryllia compacts, it is preferred to coat oxide fuel particles of a particle size between about 80 microns and 500 microns with a homogeneous mixture of beryllia powder and additive. The beryllia coating may be applied in a suitable manner, as by spraying the mixture, in a slurry form, over the fuel particles while they are tumbled in a rotating drum. Uniform coating of the fuel particles assures minimal and uniform spacing between particles within the resultant beryllia matrix compact, guarding against the creation of fuel particle agglomeration and hot spots. The volume ratio of fueled particles to beryllia may be varied depending on reactor requirements but will usually be from about 1 to about 35 volume percent of nuclear fuel material.

The beryllia slurry preferably includes an organic binding material and a suitable carrier. The carrier should have a solubility for the organic binding material and a high vapor pressure at room temperature; a preferred carrier is trichloroethylene. The organic binding material may be used to provide the carbon additive of this invention by subsequent heat treatment of the coated fuel particles with reducing or inert atmospheric conditions. If carbon is not desired as an additive, the organic binding material may be removed by heat treatment prior to sintering. The coated fuel particles are then dried and formed into the desired shape. The resultant shape may be sprayed or coated with additional beryllia slurry. Such an outer coating provides an exterior barrier which obviates the possibility of nuclear fuel exposure on the surface of the compact which would result in higher fission product release.

Sintering of the compacts may be effected by a hot pressing technique or by cold forming followed by heat treatment at sintering temperatures. In this connection hot pressing at pressures of from about 2000 p.s.i. to about 4000 p.s.i. for times of from about 3 minutes to about 40 minutes at temperatures of from about 1500° C. to about 2000° C. is generally adequate. Cold forming is preferably effected by pressing at pressures of from about 8000 p.s.i. to about 80,000 p.s.i. followed by heat treatment of from about 1600° C. to about 1700° C. for periods of from about 30 minutes to about 200 minutes.

For unfueled compacts the beryllia powder may be dry mixed with the desired pore-closing additive and directly cold pressed and sintered or hot pressed. When the compacts are cold pressed it is preferred to include an organic binder to provide suitable green strength prior to sintering.

The following example further illustrates various features of the invention but is intended to in no way limit the scope of the application which is defined in the appended claims.

*Example I*

A slurry is prepared containing 98 weight percent beryllia in trichloroethylene. To this slurry is added sufficient ethylcellulose to constitute about 2 percent of the total weight of beryllia. Approximately half of the ethylcellulose is presnt as carbon after the sintering step.

The beryllia slurry is then sprayed over particles of uranium-thorium oxide nuclear fuel material which have been prepared by a sol gel process. The fuel particles are an average of 150 microns in size. After being sprayed to provide a coating about 100 microns thick, the coated particles are dried and lightly pressed at 10,000 p.s.i. to provide a cylindrical compact measuring 0.5 inch diameter by 1.5 inch high. The compact is then sprayed with additional beryllia slurry to provide an even coating over the entire surface of the compact.

The compact is then dried and hot pressed at a pressure of 4000 p.s.i. at a temperature of 1670° C. for 7 minutes. The compact has an average density, expressed as a percent of theoretical density, of 99.7. The nuclear fuel content of the sintered compact is about 25 volume percent. The average grain size of the beryllia is 7 microns. The water uptake, which is a measure of the porosity, is 0.0006 gram. The compact is then subjected to irradiation with thermal neutrons and subsequently annealed in a furnace for about 1.0 hour. The $R/B$ ratio for Xe-135 measures about $1.0 \times 10^{-6}$. These results are shown below in Table I along with the results from similarly testing a control sample which does not contain a pore-closing additive. The control sample is prepared according to the above procedure with the exception that the lightly pressed and coated compact is subjected to a temperature of 600° C. in a hydrogen atmosphere for 200 minutes prior to hot pressing to remove the ethylcellulose. Comparison of the two samples shows that the carbon additive greatly decreases the porosity and improves the $R/B$ ratio of the sintered compact.

*Example II*

Another compact is made in accordance with the procedure of Example I with the exception that 6 weight percent ethylcellulose is incorporated into the beryllia slurry. Results relating to density, water uptake, grain size and $R/B$ ratio are reported below in Table I. It can be seen that grain size and porosity are reduced and the $R/B$ ratio greatly improved compared to the control sample.

*Example III*

Another compact is made in accordance with the procedure of Example I with the exception that 6 weight percent ethylcellulose is incorporated into the beryllia slurry and that the compacts are hot pressed at a temperature of 1900° C. Results relating to density, water uptake, grain size and $R/B$ ratio are reported below in Table I. The compact has a greatly improved $R/B$ ratio, and porosity and grain size are substantially reduced over that of the control sample.

*Example IV*

Another compact is made in accordance with the procedure of Example I with the exception that 1 weight percent SiC and 2 weight percent ethylcellulose is incorporated into the beryllia slurry. The compact is hot pressed at a pressure of 4000 p.s.i. at a temperature of 1900° C. Results relating to density, water uptake, grain size and $R/B$ ratio are reported below in Table I. The compact has greatly improved $R/B$ ratio compared to the control sample and its porosity and grain size are substantially reduced over that of the control sample.

*Example V*

Another compact is made in accordance with the procedure of Example I with the exeption that ⅓ weight percent $SiO_2$ and 2 weight percent ethylcellulose is incorporated into the beryllia slurry. Results relating to density, water uptake, grain size and $R/B$ ratio are reported below in Table I. The compact has a greatly improved *R/B* ratio compared to the control, and porosity and grain size are substantially reduced over that of the control.

Table I shows that the permeability to fission products of ceramic compacts prepared according to the practice of this invention is very low compared to a control sample

TABLE I

| Example Number | Additives Used and Amounts | Hot Pressing Conditions, T. (° C.)/t. (min.) | Percent T.D. | Water Uptake, Water (grams) | Grain Size (microns) | Xe-135 *R/B* at 1,400° C. after 1 hour |
|---|---|---|---|---|---|---|
| Control | None | 1,900/7 | 99.7 | 0.0044 | up to 250 | $<1.0 \times 10^{-2}$ |
| I | 2 wt. percent E.C. | 1,670/7 | 99.7 | 0.0006 | 6–8 | $1 \times 10^{-6}$ |
| II | 6 wt. percent E.C. | 1,670/7 | 98.8 | 0.0004 | 2 | $2 \times 10^{-7}$ |
| III | 6 wt. percent E.C. | 1,900/7 | 99.0 | 0.0003 | 2 | $8 \times 10^{-6}$ |
| IV | 1 wt. percent SiC + 2 wt. percent E.C. | 1,900/7 | 99.8 | 0.0006 | 6–8 | $6.8 \times 10^{-7}$ |
| V | ⅓ wt. percent SiO$_2$ + 2 wt. percent E.C. | 1,670/7 | 99.9 | 0.0001 | 4–12 | $1.7 \times 10^{-7}$ |
| VI | 1 wt. percent SiO$_2$ + 2 wt. percent E.C. | 1,670/7 | 100 | 0.0001 | 2–4 | $1.3 \times 10^{-7}$ |
| VII | 1 wt. percent SiO$_2$ | 1,670/7 | 100 | 0.0001 | 3–4 | $2 \times 10^{-6}$ |

Example VI

Another compact is made in accordance with the procedure of Example I with the exception that 1 weight percent SiO$_2$ and 2 weight percent ethylcellulose is incorporated into the beryllia slurry. Results relating to density, water uptake, grain size and *R/B* ratio are reported below in Table I. The compact has a greatly improved *R/B* ratio compared to the control, and porosity and grain size are substantially reduced over that of the control sample.

Example VII

Another compact is made in accordance with the general procedure of Example I with the exception that 1 weight percent silicon dioxide and 2 weight percent ethylcellulose are incorporated into the slurry. After the compact is lightly pressed into the desired shape and coated with additional beryllia slurry and dried, it is treated at a temperature of 600° C. for a period of 200 minutes in hydrogen atmosphere to remove the ethylcellulose. The compact is then hot pressed in accordance with the conditions of Example I. Results relating to density, water uptake, grain size and *R/B* ratio are reported below in Table I. The compact has a greatly improved *R/B* ratio compared to the control, and porosity and grain size are substantially reduced over that of the control sample.

which omitted the pore-closing additives, and that there is a substantial decrease in porosity and grain size.

What is claimed is:

1. A ceramic compact with improved fission product retention characteristics for use in a nuclear reactor consisting essentially of (a) beryllia; (b) an additive selected from the group consisting of silicon dioxide, silicon carbide, thorium oxide, carbon and mixtures of carbon and silicon carbide, of carbon and thorium oxide and of carbon and silicon dioxide, said additive being present at a level of from about 0.3 percent to about 6% by weight of the compact; and (c) particles of a nuclear fissile or fertile material admixed with said beryllia and said additive.

2. A ceramic compact according to claim 1 in which material said particles are from about 80 microns to about 500 microns in size.

3. A ceramic compact according to claim 1 wherein the nuclear fissile or fertile material is present at a level of from about 1 percent to about 35 percent by volume of the ceramic compact.

References Cited

UNITED STATES PATENTS

| 2,818,605 | 1/1958 | Miller | 264—.5 |
| 3,165,417 | 1/1965 | Turner | 106—55 |
| 3,213,162 | 10/1965 | Johnson et al. | 264—.5 |

L. DEWAYNE RUTLEDGE, *Primary Examiner.*